A. J. PIERCE, DEC'D.
K. M. PIERCE, EXECUTRIX.
MOTOR.
APPLICATION FILED MAY 28, 1918. RENEWED JAN. 27, 1921.

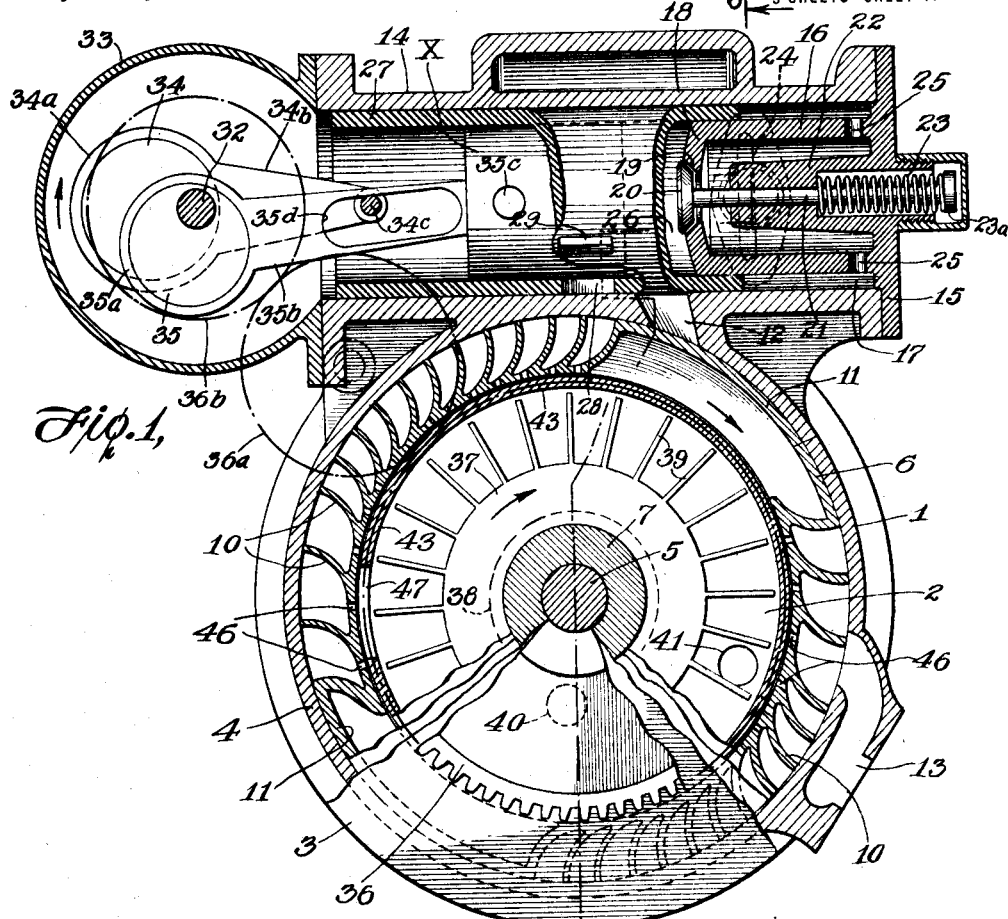
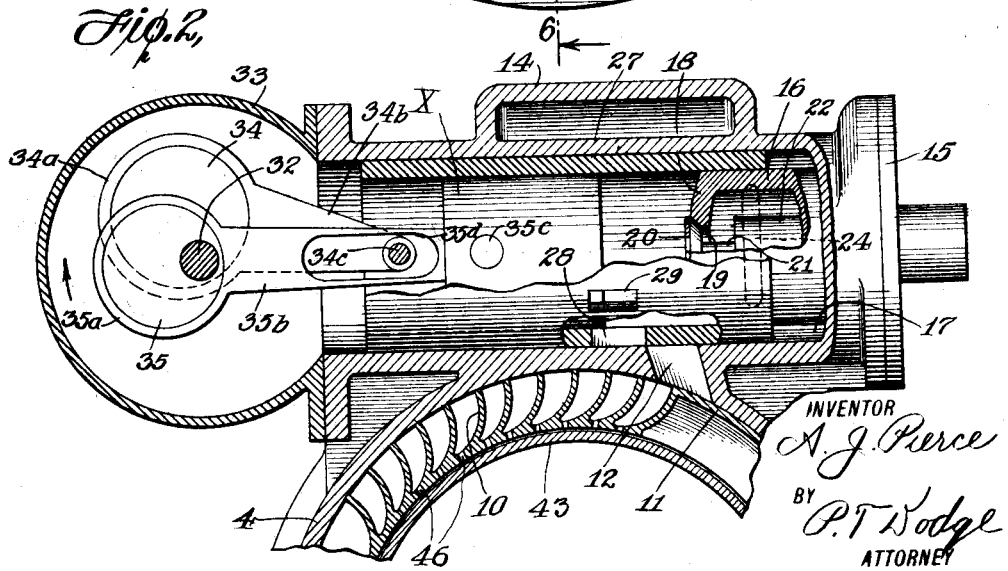

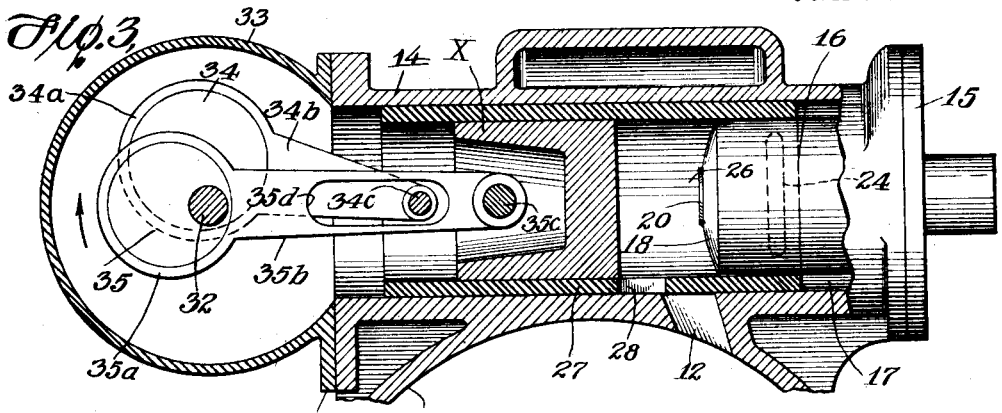
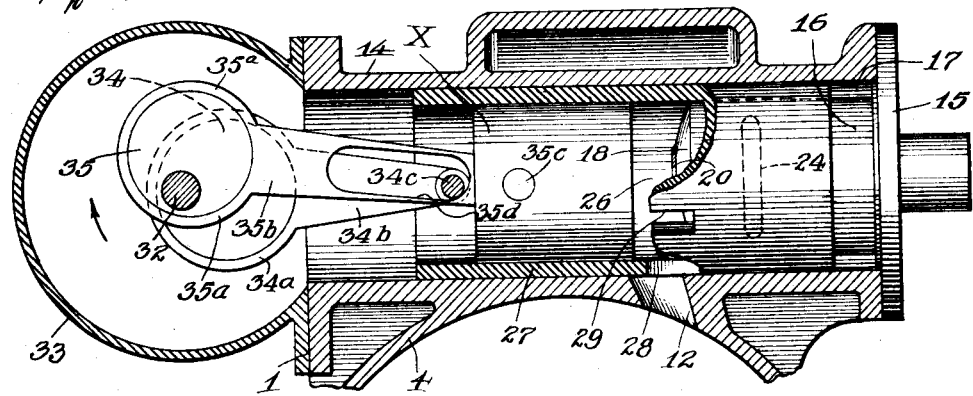
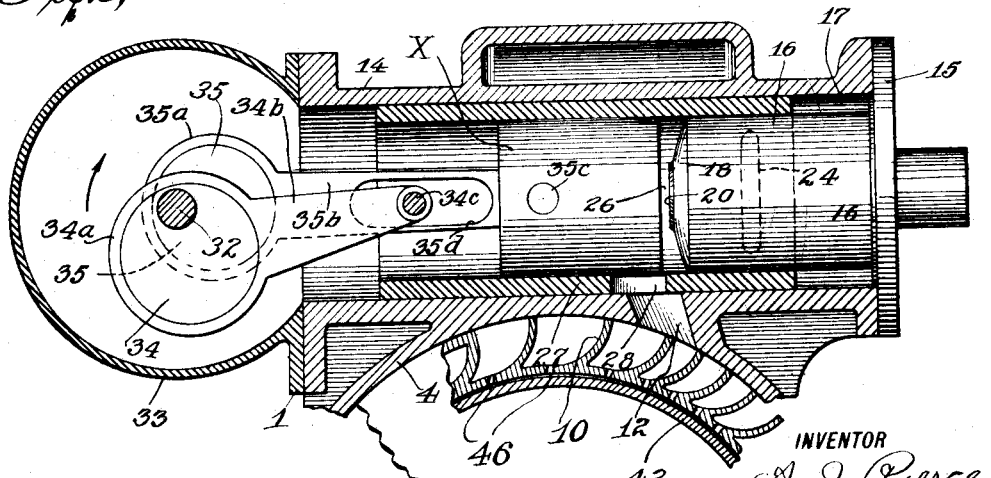

1,388,371. Patented Aug. 23, 1921.
3 SHEETS—SHEET 3.

INVENTOR
A. J. Pierce
BY
P. T. Dodge
ATTORNEY

UNITED STATES PATENT OFFICE.

ANDREW J. PIERCE, OF CHICAGO, ILLINOIS; KATHERINE M. PIERCE EXECUTRIX OF SAID ANDREW J. PIERCE, DECEASED.

MOTOR.

1,388,371.     Specification of Letters Patent.     Patented Aug. 23, 1921.

Application filed May 28, 1918, Serial No. 237,053. Renewed January 27, 1921. Serial No. 440,515.

*To all whom it may concern:*

Be it known that I, ANDREW J. PIERCE, a citizen of the United States, and a resident of Chicago, county of Cook, and State of Illinois, have invented a new and useful Improvement in Motors, of which the following is a specification.

This invention relates to internal combustion motors and has particular reference to that type of motor in which the combustible charge, previously compressed, is ignited and admitted to a rotor or turbine to drive the same, the object of the invention being to produce a motor which will be simple and compact in form and construction, will be smooth running, and will be capable of the maximum efficiency.

To attain these and other objects, in accordance with my invention the combustible explosive charge, previously compressed, is admitted to a combustion chamber wherein the charge is ignited, and the ignited charge admitted to a rotor in the form of a turbine engine, and acting on the buckets of the turbine, the latter is rotated, the passage of the charge into the combustion chamber, the firing of the charge therein, the admission of the fired charge into the turbine and the expulsion of the dead products of combustion from the combustion chamber, being controlled by controlling devices of improved form and construction operated positively in timed relation to the operation of the turbine.

The invention consists also in combining with the turbine, a rotary fan or blower driven by the rotation of the turbine and acting to reduce the temperature on the interior of the same.

The invention consists also in the details of construction and combination of parts hereinafter described and claimed.

In the accompanying drawings:

Figure 1 is an elevation of my improved motor partly in section and with other parts broken away, the parts of the mechanism being shown in the position they occupy when the compressed charge is entering the combustion chamber.

Fig. 2 is a similar view of the combustion chamber showing the parts in the position they occupy at the moment of the ignition of the charge.

Fig. 3 is a view similar to Fig. 2 showing the parts in the position they occupy when the ignited charge is being admitted to the turbine.

Fig. 4 is a similar view showing the plunger piston advancing to expel the dead products of combustion.

Fig. 5 is a similar view showing the plunger piston at the extreme end of its forward stroke, and the valve cylinder on its return stroke.

Figure 6:
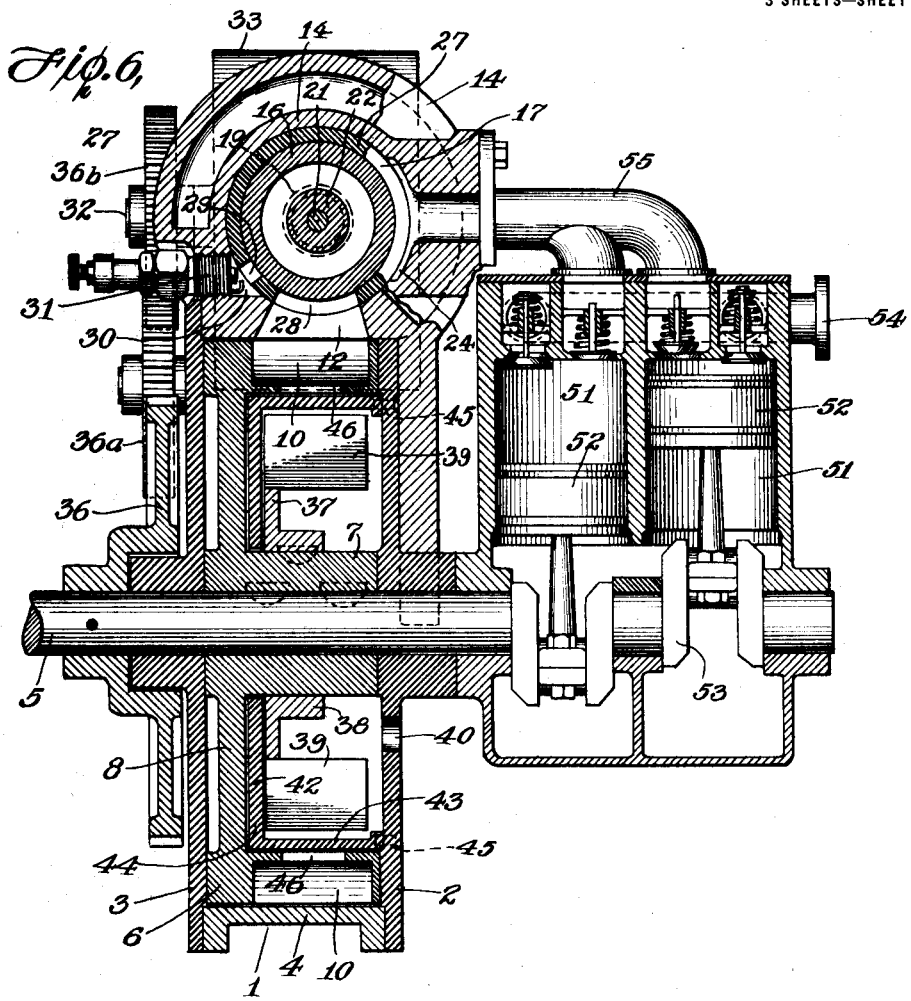
Fig. 6 is a vertical sectional elevation through the motor on the line 6—6 of Fig. 1, showing the charge compressor associated therewith.
Figure 7:
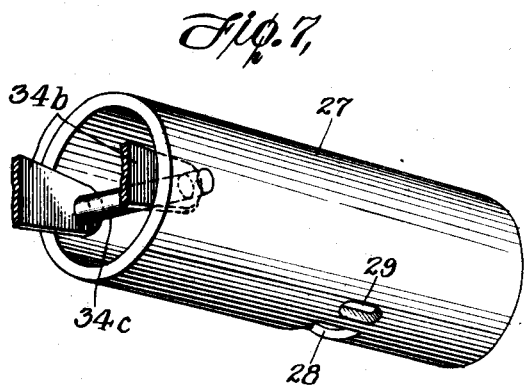
Fig. 7 is a perspective view of the valve cylinder.
Figure 8:
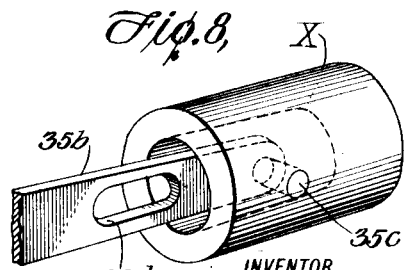
Fig. 8 is a perspective view of the plunger piston.

Referring to the drawings:

1 designates an upright turbine housing comprising two vertical circular plates 2 and 3 constituting the side walls of the housing, and an annular ring 4 extending between the plates and constituting the end or peripheral wall of the housing.

5 designates a horizontal motor shaft extending centrally through the housing and mounted in bearings therein.

6 designates a turbine wheel mounted on the motor shaft within the housing, the said wheel being provided with a hub 7 keyed to the shaft, and a body portion 8 in the form of a disk extending radially from one end of the hub adjacent the wall 3. An annular rim projects axially from the outer edge of the body of the wheel, in which rim two series or groups of turbine buckets 10 are formed. These groups are separated from each other by intact portions 11 of the rim, the open outer ends of the buckets being closed by the peripheral wall of the housing, in close proximity to which the buckets travel in the rotation of the wheel.

The wheel is adapted to be rotated in the direction of the arrow in Fig. 1 and the fired charge enters the buckets in succession through an admission port 12 extending through the peripheral wall of the housing at its top, the spent gases being exhausted through an exhaust port 13 in said wall about 95 degrees, more or less, from the admission port.

As before stated, the buckets are arranged in two separated groups, which are disposed at diametrically opposite points on the wheel, but this arrangement is not essential to my invention, as the buckets may be arranged continuously throughout the circumferential extent of the wheel without departing from the limits of the invention.

I prefer to form the buckets so that they will vary in size and capacity, those in advance and those first to receive the full force of the fired charge being the smaller, and the buckets gradually increasing in size toward the rear end of the series, so as to present a larger surface to the gases as the expansive force of the same decreases.

Mounted on the top of the turbine housing, is a horizontal cylindrical casing 14 with the interior of which the admission port 12 communicates. At one end this casing is closed by a head 15 from which extends axially into the casing, a hollow cylindrical valve casing 16 spaced from the casing 14 so as to leave an annular surrounding channel 17 between the two. The inner end of the valve casing is closed by a cap 18 containing a central valve opening 19 which is closed by a check valve 20. This valve has fixed to it a valve stem 21 guided in a central boss 22 projecting inwardly from the center of the head 15, the outer portion of which boss is chambered to receive a spiral spring 23 whose inner end bears against an annular shoulder on the boss, while its outer end bears against a head $23^a$ on the outer end of the stem, the tendency of the spring being to hold the valve yieldingly in closed position. The valve casing 16 thus constitutes a valve chamber into which the combustible charge from the compressor, to be referred to more particularly hereinafter, enters after first passing through an inlet port 24 in the side of the casing 14, and passing through openings 25 extending through the valve casing 16 near its outer end, the said charge lifts the check valve and escapes into a combustion chamber 26, now to be described.

The combustion chamber is formed by means of a hollow open-ended valve cylinder 27 mounted to reciprocate within the casing 14, with the end of the cylinder surrounding the valve casing 16 and sliding thereon in the annular channel 17, and a cylindrical plunger-piston X mounted to reciprocate within the valve cylinder, the combustion chamber being thus bounded on its periphery by the valve cylinder, and being bounded at its ends respectively by the inner end of the plunger-piston and the inner end of the valve casing 16.

The valve cylinder is provided in its side with a port 28 which in a certain position of the cylinder will register with the admission port 12 and admit the fired charge to the turbine, and it is provided also with an ignition port 29 situated above the port 28 and in circumferential alinement therewith, which port 29 will in a certain position of the valve cylinder, register with a firing chamber 30 formed in the cylindrical casing 14 and containing a spark plug 31, as shown in Fig. 6, by which the explosive charge is ignited.

The valve cylinder and plunger piston are positively reciprocated in timed relations to each other by means of a horizontal rotary shaft 32 mounted in bearings in a hollow head 33 fixed to the end of the casing 14 opposite the head 15, the said shaft having fixed to it a pair of large spaced eccentrics 34, and a single smaller eccentric 35 which is arranged between the other eccentrics. The eccentrics 34 are encircled by eccentric straps $34^a$ connected to pitmen $34^b$ whose inner ends are connected with a cross pin $34^c$ extending across the end of the valve cylinder and connected therewith. The eccentric 35 is encircled by an eccentric strap $35^a$ connected with a pitman $35^b$ whose inner end is connected with a pin $35^c$ carried by the plunger-piston, the said pitman $35^b$ being formed with a longitudinal slot $35^d$ in which the cross pin $34^c$ extends.

The shaft 32 is rotated from the motor shaft 5 by suitable driving connections, in the present instance by a train of gearing which will give the shaft 32 two revolutions for every revolution of the motor shaft, so as to admit two charges to the turbine in each cycle of operation of the latter. This gearing is shown in Figs. 1 and 6 where it will be seen that a driving gear wheel 36 is fixed to the motor shaft and meshes with a transmitting pinion $36^a$ mounted on a journal on the side of the turbine housing, which transmitting pinion meshes in turn with a driven gear $36^b$ on the end of the shaft 32, the relative sizes of the several gears and pinions being such that the shaft 32 will be given two revolutions for every revolution of the motor shaft.

The relations of the eccentrics, the valve cylinder and plunger-piston, are such that when the compressed charge is entering the combustion chamber as shown in Fig. 1, the valve cylinder will be at the end of its return stroke, whereby the end of the valve cylinder will uncover the inlet port 24 to permit the compressed charge to enter, and the ports in the valve cylinder will be covered by the plunger-piston. In this position of the parts the large eccentrics are on their full back "dead center," and the small eccentric some degrees off, but approaching its back "dead center." As the shaft 32 is rotated in the direction of the arrow, the valve cylinder is advanced as shown in Fig. 2 and its end covers the inlet port 24, and the plunger-piston retreats, the plunger-piston in this movement uncovering the ignition port 29 in the valve cylinder and establishing communication between said port and the combustion chamber, the advancing movement of the valve cylinder causing said ignition port to register with the firing chamber, while at the same time advancing port 28 toward the admission port 12 nearly into communication therewith. The small eccentric is now within about 5 degrees of its back "dead center," and the large eccentrics are considerably past their back "dead center." This is the position of the parts at the moment that the charge is ignited, and as the explosion occurs, the large eccentrics, being in the period of their rapid movement, the valve cylinder will be quickly advanced and port 28 therein will be moved quickly into registry with admission port 12, thereby admitting the fired charge to the turbine, the plunger-piston in the mean time being moved to its full back "dead center" and being at the moment of the explosion, practically at a stand-still so that the full force of the explosion is permitted to act on the turbine. This position of the parts is shown in Fig. 3. The motion of the parts now continuing, the plunger-piston is moved quickly forward and expels the dead products of combustion from the combustion chamber, while at the same time the valve cylinder continues its advance until the port 28 therein is in full registry with the admission port as shown in Fig. 4; and the movement of the parts continuing, the plunger-piston finally reaches the extreme end of its advancing movement and thereby expels all the dead products of combustion, and the valve cylinder completes its advancing movement and starts on its return movement as shown in Fig. 5.

In the action of the parts described, one group of the turbine buckets receives the propelling charge which is exhausted as the buckets pass in succession by the exhaust port, and by the time the valve cylinder and plunger-piston again assume the positions shown in Fig. 1 with the next charge entering the combustion chamber, the other group of turbine buckets will have reached the position, where, on the ignition of the second charge, the foremost bucket of the group will be in registry with the admission port. The turbine therefore receives two impulses in every revolution of the turbine wheel, the valve cylinder and plunger-piston performing two cycles of operation in every revolution of the turbine wheel, and admitting the two propelling charges successively to the two groups of buckets.

It will be observed from the foregoing description that the movements of the parts controlling the inlet of the compressed charge, its ignition, the admission of the charge to the turbine, and the expulsion of the dead products of combustion, are effected positively and in timed relations to the rotation of the turbine, thereby securing uniformity and certainty of action and the greatest efficiency in operation. The full explosive force of the charge being applied directly to the turbine buckets before any undue radiation of heat occurs, the full effect of the explosion is obtained. Furthermore, due to the relative position of the plunger-piston at the moment that the explosion takes place, the full expansive force of the explosion is available, inasmuch as the plunger piston at this moment is practically on a "dead center" and substantially at rest, so that it affords an unyielding abutment against which the explosive force reacts on the turbine with its full effect and without liability of pounding or knocking or other objectionable action.

Due to the fact that the inlet port 24, through which the compressed charge enters the cylindrical casing, is closed by the valve cylinder just before the charge is ignited, the incoming charge will be prevented from being fired back into the compressor in the event of dirt or other foreign matter lodging on the valve seat 19.

As a result of these several features of construction and their functional action, my improved motor will run with great smoothness and regularity, and with the maximum of efficiency, the construction being simple and compact in form and economical to produce.

I propose to provide the turbine with a fan or blower in order to reduce the temperature within the housing. As shown more particularly is Figs. 1 and 6, this fan is situated in the turbine housing in the annular space between the hub and rim of the turbine wheel, and it consists of a disk 37 having a hub 38 fixedly mounted on the hub of the turbine wheel so as to be rotated thereby, the disk having projecting horizontally from its peripheral edge, a series of radial fan blades 39. An opening 40 is formed in the wall 2 of the turbine housing near the center of the same for the admission of air to the fan chamber, and after being circulated around the interior of the housing, the surplus air escapes through a second opening 41 through said wall at a point outward of the other opening.

A lining or distance piece 42 is fixed to the turbine housing and comprises a circumferential portion 43 extending axially between the bottoms of the buckets and the outer ends of the fan blades, and a radial portion 44 extending inwardly from the circumferential portion, between the body portion of the turbine wheel and the adjacent side of the fan, the said distance piece being fixed in position by means of bolts 45 extending through the side wall 2 of the housing and screwed into the edge of the circumferential portion of the distance piece. The bottoms of the turbine buckets are formed with openings 46 into which the air is forced by the fan as the buckets register in succession with an opening 47 in the circumferential portion of the distance piece. The air will be forced by the fan into the buckets— the last two or three larger ones only—and as these pass port 12 the air will be thrown into port 12 and will fill the same. Now as the fired charge for the next impulse enters port 12 the pressure will fall somewhat before it reaches the succeeding series of buckets, the air trapped in this passage being heated by the charge on its way from the combustion chamber to the buckets, and will thus help to keep up the pressure until the charge acts on the turbine. As a result the economy of operation will be greatly assisted.

The bottoms of the buckets travel in close proximity to the outer face of the circumferential portion of the distance piece, and the latter by extending inwardly from said circumferential portion between the side of the fan and adjacent side of the turbine wheel, prevents the escape of any gas at this point, and the leakage of the charge around the turbine. It will be understood that these parts will travel in sufficiently close proximity to each other to form a gas-tight joint, and suitable packing rings may be used to effect this object.

The combustible charge is compressed before its entrance into the combustion chamber, by a compressor of any suitable and appropriate form and construction. I prefer to employ for this purpose a piston compressor such as shown in Fig. 6, and to attach the same to the side of the turbine housing so that the compressor may be operated by the motor shaft 5. On reference to this figure it will be seen that there is attached to the side of the turbine housing, two vertical compression cylinders 51 in which operate compression pistons 52 reciprocated from a horizontal crank shaft 53 connected with and forming a continuation of the motor shaft 5. The cylinders are provided as usual with inlet and outlet valves so that by the operation of the pistons, the combustible gases admitted to the cylinders at the gas inlet 54 will be delivered under pressure to the outlet pipe 55, which pipe is connected with the inlet opening 24 in the cylindrical casing 14.

While I have shown my invention embodied in a construction in which there are two groups of buckets on the turbine wheel, in which two propelling charges are admitted in every revolution of the turbine, it will be understood that the number of groups of buckets may be increased, and a corresponding increase be made in the number of driving charges admitted for each revolution, and this without departing from the limits of my invention.

In the foregoing description and accompanying drawings I have set forth my invention in the particular detailed form and construction which I prefer to adopt. But it will be manifest that the details may be variously changed and modified without departing from the limits of my invention, provided the operation will be substantially as indicated above. Further it will be understood that the invention is not limited to any particular form or construction of the parts, except in so far as such limitations are specified in the claims.

Having thus described my invention, what I claim is:

1. In an internal combustion motor, the combination of a turbine wheel and its inclosing housing, a casing communicating with the said housing through an admission port, said casing being provided with an inlet port for the entrance of the compressed explosive charge, a reciprocating valve cylinder in the casing inclosing a combustion chamber, said valve cylinder being provided with a port adapted to register with the admission port to admit the fired charge to the turbine, means for firing the charge in the combustion chamber, and a plunger-piston reciprocating in the valve cylinder relatively thereto and adapted to expel the dead products of combustion from the combustion chamber.

2. In an internal combustion motor, the combination of a turbine wheel and its inclosing housing, a casing communicating with the housing through an admission port, said casing being provided with a firing chamber and being provided also with an inlet port for the entrance of the compressed explosive charge, a reciprocating valve cylinder in said casing inclosing a combustion chamber, said valve cylinder being provided with a port adapted to register with the firing chamber and provided with a second port adapted to register with the admission port to admit the fired charge to the turbine, and a plunger-piston reciprocating in the valve cylinder relatively thereto and adapted to expel the dead products of combustion from the combustion chamber.

3. In an internal combustion motor, the combination of a turbine wheel and its inclosing housing, a casing communicating with said housing through an admission port, said casing being provided with an inlet port for the entrance of the compressed explosive charge, a valve cylinder reciprocating in the casing and inclosing a combustion chamber, said cylinder coöperating with the inlet port in controlling the entrance of the compressed charge, and coöperating also with the admission port in admitting the fired charge to the turbine, means for firing the charge in the combustion chamber, and means movable relatively to the valve cylinder for expelling the dead products of combustion from the combustion chamber.

4. In an internal combustion motor, the combination of a turbine wheel and its inclosing housing, a casing communicating with the housing through an admission port and provided in its side with an inlet port for the entrance of the compressed explosive charge, a valve casing extending into one end of said first mentioned casing and spaced therefrom to leave an annular surrounding channel and communicating with the inlet port, said valve casing inclosing a valve chamber communicating with the annular channel, a reciprocating valve cylinder mounted in the first mentioned casing with one end surrounding the valve casing within the annular channel and adapted in its reciprocations to respectively open and close the inlet port, said valve cylinder inclosing a combustion chamber, a valve controlling the entrance of the compressed charge from the valve chamber to the combustion chamber, means for firing the charge in the combustion chamber, means controlled by the reciprocation of the valve cylinder for admitting the fired charge to the turbine, and means for expelling the dead products of combustion from the combustion chamber.

5. In an internal combustion motor, the combination of a turbine wheel and its inclosing housing, a casing communicating with said housing through an admission port and provided with an inlet opening for the admission of the compressed explosive charge, a reciprocating valve cylinder in said casing inclosing a combustion chamber, said valve cylinder being provided with a port adapted to register with the admission port, means for firing the charge in the combustion chamber, a reciprocating plunger-piston in the valve cylinder to expel the dead products of combustion from the combustion chamber, and driving connections between the turbine wheel and the valve cylinder and plunger-piston for reciprocating them in timed relations to each other.

6. In an internal combustion motor, the combination of a turbine wheel and its inclosing housing, said housing being provided with an admission port, a combustion chamber, means for admitting thereto a compressed explosive charge, a reciprocating plunger movable in the combustion chamber, means for firing the charge in the combustion chamber when the plunger-piston is substantially at the end of its rearward stroke, whereby the plunger-piston will form a substantially fixed abutment to receive the force of the explosion, and means for admitting the fired charge immediately thereafter into the admission port, whereby the plunger-piston in its forward stroke will expel the dead products of combustion.

7. In an internal combustion motor, the combination of a turbine wheel and its inclosing housing, an admission port, a casing communicating with said admission port, a reciprocating valve cylinder in the casing inclosing a combustion chamber and provided with a port adapted in the forward movement of the cylinder to register with the admission port, means for the admission of a compressed explosive charge to the combustion chamber, a reciprocating plunger-piston in the valve cylinder adapted on its forward stroke to expel the dead products of combustion, and means for firing the charge in the combustion chamber when the plunger piston is substantially at the end of its rearward stroke, and when the valve cylinder is making its forward stroke; whereby the force of the explosion will be exerted against a substantially fixed abutment constituted by the plunger, and will immediately thereafter be admitted by the valve cylinder to the admission port.

8. In an internal combustion motor, the combination of a turbine wheel and its inclosing housing, a casing communicating therewith through an admission port, a reciprocating valve cylinder in said casing inclosing a combustion chamber, said valve cylinder being provided with a port adapted on the forward stroke of the cylinder to register with the admission port, means for admitting a compressed explosive charge to the combustion chamber, a reciprocating plunger-piston in the valve cylinder adapted on its forward stroke to expel the dead products of combustion, an eccentric operatively connected with the plunger-piston to reciprocate the same, a second eccentric operatively connected with the valve cylinder to reciprocate the latter, means for driving said eccentrics in timed relations to each other, and means for firing the charge in the combustion chamber at the moment that the eccentric for the plunger piston on its rearward stroke is approximately 5 degrees of its back "dead center," and when the eccentric for the valve cylinder on its forward stroke is approximately 62 degrees of its back "dead center."

9. In an internal combustion motor, the combination of a turbine wheel provided with two circumferential groups of buckets, a combustion chamber, mechanism operable in successive cycles to admit compressed explosive charges to the combustion chamber, to fire said charges and admit the fired charges to the turbine, and driving connections between the turbine and said mechanism, timed to cause two cycles of operation of the said mechanism in every revolution of the turbine; whereby the turbine will receive two driving impulses in each revolution.

10. In an internal combustion motor, the combination of a turbine housing comprising side walls and a circumferential connecting wall provided with an admission port for the admission of the fired charge, a motor shaft mounted in said housing, a turbine wheel mounted on the shaft within the housing adjacent one side wall thereof and having peripheral buckets extending axially toward the other side wall and provided with openings in their bottoms, said buckets adapted in the rotation of the wheel to pass in succession by the admission port, a rotary fan mounted on the motor shaft between the turbine wheel and the opposite wall of the housing, and a distance piece fixed to the housing and comprising an axial peripheral portion extending between the bottom of the buckets and the periphery of the fan and serving to close the openings in the bottoms of the buckets, and a radial portion extending between the side of the fan and the side of the turbine wheel and serving to prevent leakage of the charge.

11. In an internal combustion motor, the combination of a turbine housing comprising side walls and a circumferential connecting wall provided with an admission port for the admission of the fired charge, a motor shaft mounted in said housing, a turbine wheel on the shaft within the housing and provided with buckets extending axially at the periphery of the wheel, said buckets having openings in the bottoms, and a rotary fan mounted on the shaft within the housing inward of said buckets, and a distance piece provided with a peripheral portion extending in close proximity to the openings in the bottoms of the buckets and serving to close the same, and having a peripheral opening through which the air from the fan is forced into the buckets.

12. In an internal combustion motor, the combination of a turbine housing comprising side walls and a circumferential connecting wall provided with an admission port for the admission of the fired charge, a motor shaft mounted in said housing, a turbine wheel on the shaft within the housing provided with buckets extending axially at the periphery of the wheel, said buckets having openings in their bottoms, a rotary fan mounted on the shaft within the housing inward of said buckets, and a distance piece comprising a circumferential portion extending between the bottoms of the buckets and the periphery of the fan and having an opening therethrough, and a radial portion extending between the side of the turbine wheel and the side of the fan.

13. In an internal combustion motor, the combination of a turbine housing having an admission port for the admission of the fired charge, and a turbine wheel mounted therein and having a group of peripheral buckets adapted in the rotation of the wheel to pass in succession by said port, said buckets being of successively increasing size from the forward end of the group toward its rear end.

In testimony whereof I hereunto set my hand this 23rd day of May, 1918.

ANDREW J. PIERCE.